US009219776B2

(12) United States Patent
LeCroy et al.

(10) Patent No.: US 9,219,776 B2
(45) Date of Patent: Dec. 22, 2015

(54) AGGREGATING CONTENT FROM DIFFERENT CONTENT SOURCES AT A CLOUD SERVICE

(71) Applicant: Microsoft Corporation, Redmond, WA (US)

(72) Inventors: Jonathan LeCroy, Redmond, WA (US); Gurashish Brar, Snoqualmie, WA (US); Joe Yap, Sammamish, WA (US); Victor Wang, Bellevue, WA (US); Umut Alev, Mercer Island, WA (US); Vamsi Kanamaluru, Kirkland, WA (US); Dmitri Gavrilov, Redmond, WA (US); Tali Roth, Kirkland, WA (US); Aditi Desai, Redmond, WA (US); Mike Borysenko, Redmond, WA (US); Ethan Bernstein, Sammamish, WA (US); Patrick Tousignant, Bellevue, WA (US); Fernando Garcia, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 13/925,599

(22) Filed: Jun. 24, 2013

(65) Prior Publication Data
US 2014/0379851 A1     Dec. 25, 2014

(51) Int. Cl.
*G06F 15/16*      (2006.01)
*H04L 29/08*     (2006.01)
*G06Q 10/10*    (2012.01)

(52) U.S. Cl.
CPC .............. *H04L 67/02* (2013.01); *G06Q 10/107* (2013.01); *G06Q 10/109* (2013.01)

(58) Field of Classification Search
CPC ............................. H04L 29/08; H04L 65/403
USPC ................................................... 709/204, 217
See application file for complete search history.

(56) References Cited

U.S. PATENT DOCUMENTS 7,634,732 B1    12/2009    Blagsvedt et al.
7,853,590 B2    12/2010    Simpson, Jr. et al.
7,917,468 B2     3/2011    Ariel et al.
(Continued)

OTHER PUBLICATIONS

"International Search Report & Written Opinion for PCT Patent Application No. PCT/US2014/041030", Mailed Date: Oct. 22, 2014, 14 Pages.
(Continued)

*Primary Examiner* — Adnan Mirza
(74) *Attorney, Agent, or Firm* — Damon Rieth; Tom Wong; Micky Minhas (57) ABSTRACT

A cloud service stores and aggregates content that is obtained from different content sources using different protocols. For example, the content may include electronic messages, calendar information, contacts, social network content, feed data, search results, and the like. The cloud service aggregates content for each user based on the user's configuration settings. The cloud service may perform processing on the aggregated content before it is delivered and displayed to the user on the client device. For example, one or more views may be generated and stored by the cloud service before the view is requested from the client. Changes made to the aggregated content on the client may be synchronized with the content source. Searches may be made across all or a portion of the different content sources that are aggregated for a user.

20 Claims, 10 Drawing Sheets

(56) References Cited

U.S. PATENT DOCUMENTS

| | | |
|---|---|---|
| 8,069,166 B2 | 11/2011 | Alvarado et al. |
| 2006/0282272 A1 | 12/2006 | Urasaki et al. |
| 2007/0192683 A1 | 8/2007 | Bodin et al. |
| 2012/0317208 A1 | 12/2012 | Sousa et al. |
| 2013/0166580 A1* | 6/2013 | Maharajh et al. ............. 707/758 |

OTHER PUBLICATIONS

Craddock, Dick, "Outlook.com: 400 Million Active Accounts, Hotmail Upgrade Complete and More Features on the Way", Published on: May 2, 2013, Available at: http://blogs.office.com/2013/05/02/outlook-com-400-million-active-accounts-hotmail-upgrade-complete-and-more-features-on-the-way/.

Berger, Maximilian, "Integrated PIM data management with SyncML", Retrieved on: Apr. 16, 2013, Available at: http://max.berger.name/research/syncml/syncml.pdf.

"Personal Information Management Services", Published on: Nov. 3, 2011, Available at: https://www.ctrl-shift.co.uk/research/product/58.

Khan, et al., "Open Source Software for Personal Information Managers and Personal Knowledge Management", In Proceedings of the International Conference for Internet Technology and Secured Transactions, Nov. 9, 2009, 12 pages.

"Essential PIM", Retrieved on: Apr. 16, 2013, Available at: http://www.essentialpim.com/pc-version/features.

"International Search Report Issued in PCT Patent Application No. PCT/US2014/041030", Mailed Date: Jun. 29, 2015, 9 pages.

* cited by examiner

AGGREGATING CONTENT FROM DIFFERENT CONTENT SOURCES AT A CLOUD SERVICE

BACKGROUND

Personal Information Manager (PIM) applications are commonly used by computer users. PIM applications are used for recording, tracking, and managing personal information for a user. For example, a user may use a PIM application to access email, contacts and calendar information from one or more providers. The content that is used by the PIM application may be obtained from a variety of different content sources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A cloud service stores and aggregates content that is obtained from different content sources using different protocols. For example, the content may include electronic messages, calendar information, contacts, social network content, feed data, search results, and the like. The cloud service aggregates content for a user based on the user's configuration settings. For example, a user may configure their personal information manager (PIM) application to include mail from different mail providers. The user may also configure their PIM application to include contacts from a social network, as well as calendar events from one or more calendars or content sources. Instead of the client PIM application accessing each of the individual content sources and incorporating the content into the PIM application, the cloud service obtains and aggregates the content obtained from the different content sources. The cloud service may perform processing on the aggregated content before it is delivered and displayed to the user on the client device. For example, one or more views may be generated and stored by the cloud service before the view is requested from the client. Changes made to the aggregated content on the client may be synchronized with the content source. For example, in response to a user making a change to an email that is associated with a different email provider, the change is synchronized with the different email provider. Searches may be made across all or a portion of the different content sources that are aggregated for a user. For example, a user may view the messages from a particular user regardless of the message provider providing the content to the user. Similarly, a user may perform a general search across each of the different content sources to locate items matching a search query.

DETAILED DESCRIPTION

Referring now to the drawings, in which like numerals represent like elements, various embodiments will be described.

Figure 1:
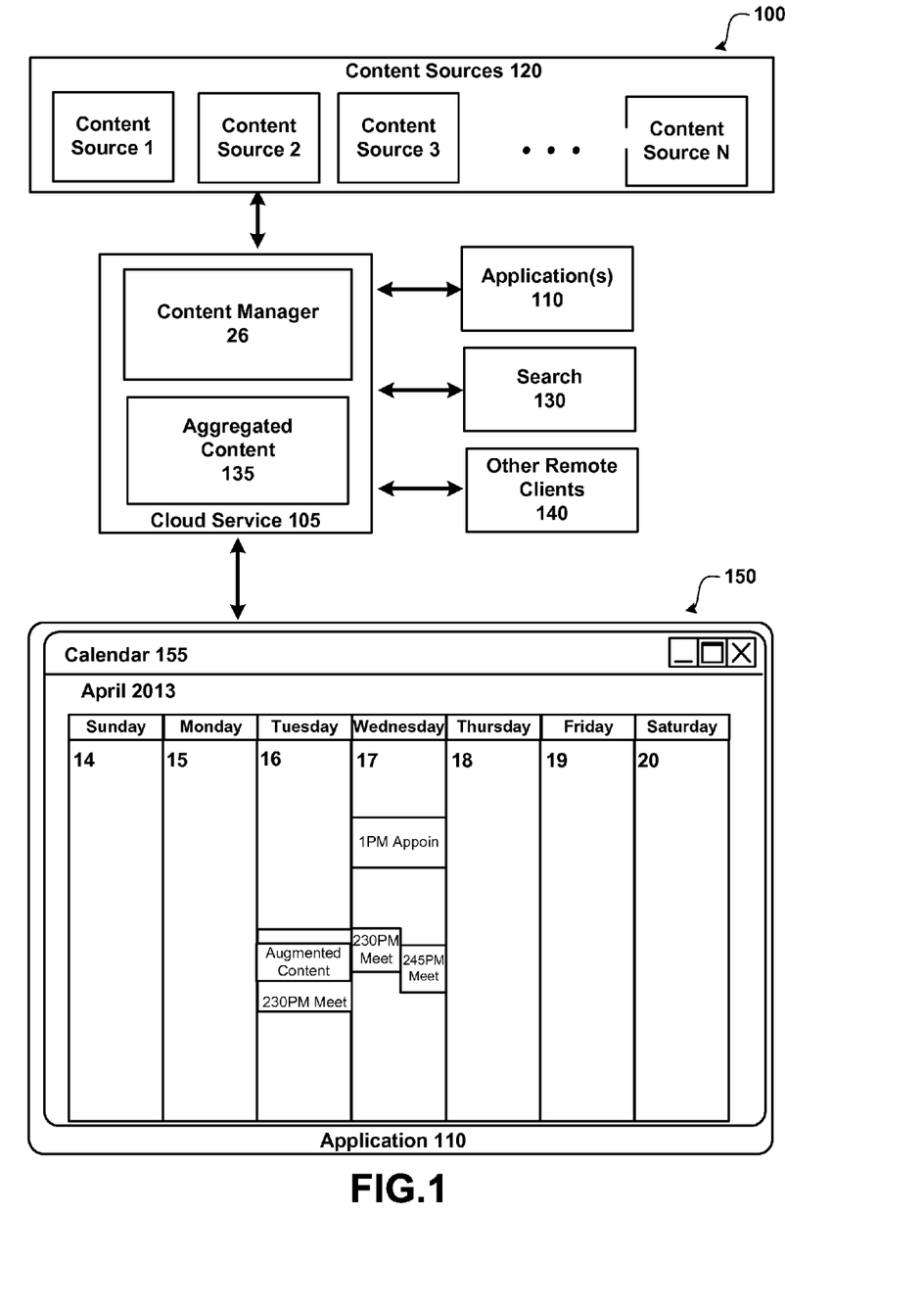
FIG. 1 shows a system including a cloud service that aggregates content for different users that is obtained from different content sources.

FIG. 1 shows a system including a cloud service that aggregates content for different users that is obtained from different content sources.

As illustrated, system 100 includes application(s) 110, content sources 120, search 130, cloud service 105, aggregated content 135, content manager 26, other remote clients 140, and computing device 150.

Content manager 26 is configured to aggregate content that is obtained from different content sources. According to an embodiment, the content is aggregated by the Cloud (e.g. "online") service 105 and is stored by the cloud service 105. For example, the aggregated content may be stored in a data store (e.g. aggregated content 135). The content sources 120 that are aggregated may include many different types of content. For example, the content sources may include content relating to electronic messages, calendars (public, private), contacts, social network content, feed data, search results, and the like.

Using content manager 26, cloud service 105 aggregates content for different users based on the configuration settings that are associated with a user. For example, a user may configure their personal information manager (PIM) application to include mail, contacts, and calendars from different service providers. The user may also configure their PIM application to include contacts from a social network, as well as calendar events from one or more content sources. Instead of a client PIM application accessing each of the individual content providers and storing the content, cloud service 105 obtains and aggregates the content that is obtained from the different content sources for the user. According to an embodiment, service 105 stores each user's data that is obtained from each content source separately.

According to an embodiment, content manager 26 may be configured to augment the aggregated content 135 to include additional content. For example, calendar events may be augmented to include: traffic information, driving directions, news information, weather information, related events, and the like. Generally, the content is augmented to include additional information relating to the content. Cloud service 105 may augment the aggregated content differently based on the type of the content being augmented. For example, electronic messages may be augmented differently as compared to when augmenting calendar events or contact cards.

As illustrated in FIG. 1, computing device 150 shows Calendar 155 that displays a weekly view of a calendar that includes different events that may be obtained from different content sources. In the current example, augmented content is shown on Apr. 16. The augmented content and the aggregated content may include content from different content sources. For example, the content may include traffic information, driving directions, location information, restaurant information, social network posts, news feeds, calendar content, mail content, and the like.

Changes made to the aggregated content on the client may be synchronized with the external content source. For example, in response to a user making a change to an email that is associated with a different email provider, content manager 26 synchronizes the change with the content stored by the different email provider.

Cloud service 105 may perform processing on the aggregated content before it is displayed or delivered to the user on a client computing device. For example, one or more views may be generated by content manager 26 and stored by the cloud service 105 before the view is requested from the client computing device.

In order to facilitate communication with content manager 26, one or more callback routines, may be implemented. Application(s) 110 may be a variety of applications, such as PIM applications, business productivity applications, entertainment applications, music applications, travel applications, video applications, and the like. Generally, application(s) 110 may be any application that includes content that may be aggregated. The application(s) 110 may be configured to receive different types of input (e.g. speech input, touch input, keyboard input (e.g. a physical keyboard and/or Software Input Panel (SIP)) and/or other types of input.

System 100 as illustrated comprises one or more touch screen input devices, such as computing device 150, that detects when a touch input has been received (e.g. a finger touching or nearly touching the touch screen). Any type of touch screen may be utilized that detects a user's touch input. For example, the touch screen may include one or more layers of capacitive material that detects the touch input. More details are provided below.

Figure 2:
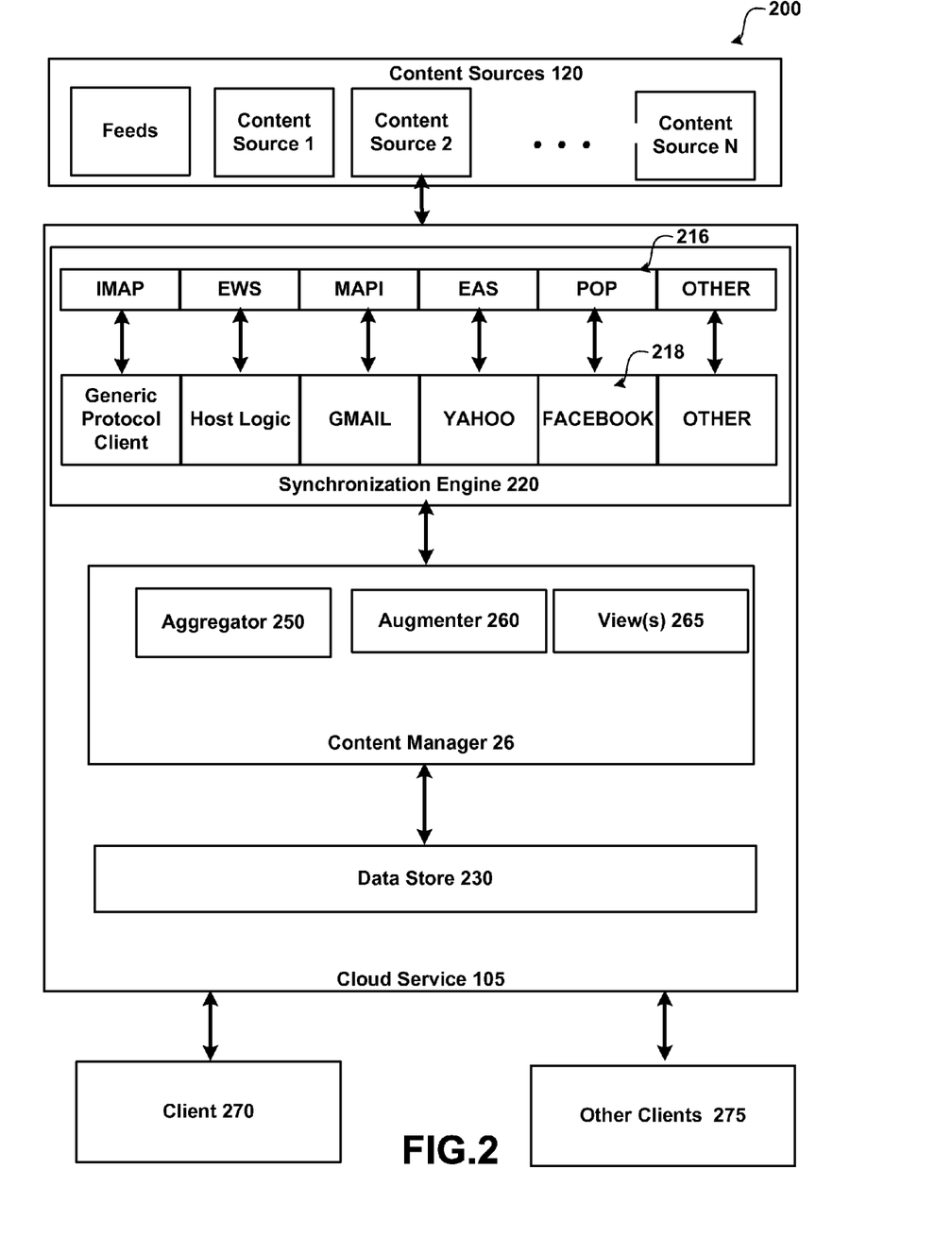
FIG. 2 illustrates a synchronization engine included in a cloud service that augments content that is obtained from different content sources.

FIG. 2 illustrates a synchronization engine included in a cloud service that augments content that is obtained from different content sources.

As illustrated, system 200 includes content sources 120, synchronization engine 220, content manager 26 including aggregator 250 and augmenter 260, data store 230, cloud service 105, client 270, and other clients 275. Instead of a client application connecting with each different content provider to obtain content, service 105 using content manager 26 obtains and aggregates content from content sources 120. According to an embodiment, a client (e.g. client 270) may use a single protocol to communicate with the different content obtained by cloud service 105.

As discussed above, content sources 120 may include many different content sources. For example, content sources 120 may include: feed sources; Personal Information Management (PIM) sources (e.g. OUTLOOK, GMAIL, YAHOO) that include content relating to electronic messages, calendars, tasks, and the like; social network sources (e.g. TWITTER, FACEBOOK, LINKEDIN . . . ); weather sources; entertainment sources; map and navigation sources; public calendar sources, private calendar sources, and the like. Generally, a content source may be any source from which content may be obtained from and aggregated for a user.

Each client (user) may determine what content they would like aggregated. For example, when a user first accesses cloud service 105, they may configure what content sources they would like to include (e.g. mail from GMAIL and YAHOO, as well as OUTLOOK email). The user may also select social network sources (e.g. YAMMER, SHAREPOINT, FACEBOOK, TWITTER, . . . ), feeds, and the like. For example, the use may select to include contacts and contact info, FACEBOOK, GMAIL, TWITTER, LINKEDIN, and the like.

In response to the user selections of the content sources, content manager 26 uses aggregator 250 to obtain the content from the content source. The retrieved content is stored in the cloud service 105 in data store 230. According to an embodiment, each content source that is selected by a user to be aggregated is stored separately within data store 230. In other words, the content from one content source is not mixed with content from another content source. According to another embodiment, the content sources may be stored mixed within data store 230.

Aggregator 250 may obtain content from the content sources in response to different events. For example, aggregator 250 may obtain content periodically, in response to a notification, or in response to some other event.

Synchronization engine 220 is configured to act an interface between the cloud service 105 and the content sources. Different content sources may use different protocols 216 to allow access to content in a content source. For example, the Internet Message Access Protocol (IMAP) is a generic protocol for email that may be used by one or more content sources. Other common protocols include Exchange Web Service (EWS), Messaging Application Programming Interface (MAPI), Exchange Active Sync (EAS), Post Office Protocol (POP), Simple Mail Transfer Protocol (SMTP), as well as many other protocols that may be associated with accessing and interacting with content in a content source. Some content sources may use their own defined protocol or may modify a common protocol. Synchronization engine 220 interacts with each content source using the protocol that is associated with the content source being accessed.

Synchronization engine 220 is configured to aggregate provider specific content. Instead of just using a generic protocol (e.g. IMAP, MAPI, . . . ) to obtain content from each content source, specific provider synchronization interfaces 218 may be created and used to obtain additional content and information from the content source. For example, the provider specific interfaces 218 may obtain information form the provider for one or more provider specific features. For example, a provider specific interface to the GMAIL service may obtain labels in GMAIL and map that information to the same feature or another feature used when a client accesses the GMAIL content (e.g. map label in GMAIL to a mail folder). According to another embodiment, the provider synchronization interfaces 218 may be configured to maintain the use of provider specific features. Generally, the provider specific interfaces 218 are configured to access features of a content provider that are not available using a common protocol that is associated with the service provider. For example, while mail may be obtained from a mail service provider using a protocol, the defined protocol may not provide functionality to interface with all of the different features that are provided by the service provider.

According to an embodiment, synchronization engine 220 is configured to allow two-way synchronization between the different content sources and data store 230 in the cloud service. For example, a user (e.g. client 270) may make a change to an email that was obtained from a different mail service provider that is synchronized back to the different service provider. This is different from traditional applications that download the content to an application but do not synchronize changes back to the service after a change is made. As another example, a user may add a folder in the client that translates in mapping the folder to a label. The provider synchronization interface logic is specific logic that applies to each content provider. Content may be synchronized to different fidelity levels.

The aggregated content for a user may be augmented with additional content using augmenter 260. The content may be augmented in response to an item being created (e.g. an appointment, a message) and/or augmented at some other time. For example, the content may be aggregated when the user opens a view of the content.

The following examples of augmenting content are examples, and are not intended to be limiting. A view of a user's calendar may be augmented using public calendar feeds. For example, the calendar feeds could be sports calendars, school calendars, social experiences, home schedules, and the like. Information relating to the calendar may also be obtained from other sources. A search may automatically be performed to locate content that is referenced in a message, in a calendar, in a task, and the like. For example, when viewing the calendar that includes a schedule of games, the scores of the games may automatically be added to the view after performing a search for the score.

Instead of each client having to obtain the content directly from the content sources using the different protocols and storing the aggregated information on the client computing device, the cloud service 105 stores the content, performs the aggregation, and delivers aggregated content to a client using a single communication channel (a single delivery protocol).

Client 270 interacts with the cloud service 105 using a single protocol even though cloud service used many different protocols to obtain the aggregated content. According to an embodiment, client 270 is a thin and portable client (e.g. it does not need to include the synchronization logic, protocols and other functionality that cloud service 105 includes). Other clients 275 also communicate with cloud service 105 to access their aggregated content.

Content manager 26 is also configured to create view(s) 265 of content before it is requested by a client. For example, a common view (e.g. a weekly view) of a user's calendar may be created in advance of the view being requested. The aggregated content may be organized into different views (e.g. month view, week view, . . . ). Each different view contains the data used to render the UI for that view. When the user opens a calendar, a current view may be loaded from memory (e.g. a cache). Other stored view data is delivered to the user when requested. Data views may also be created for other common views (e.g. contacts, mail, tasks, . . . ).

Figure 3:
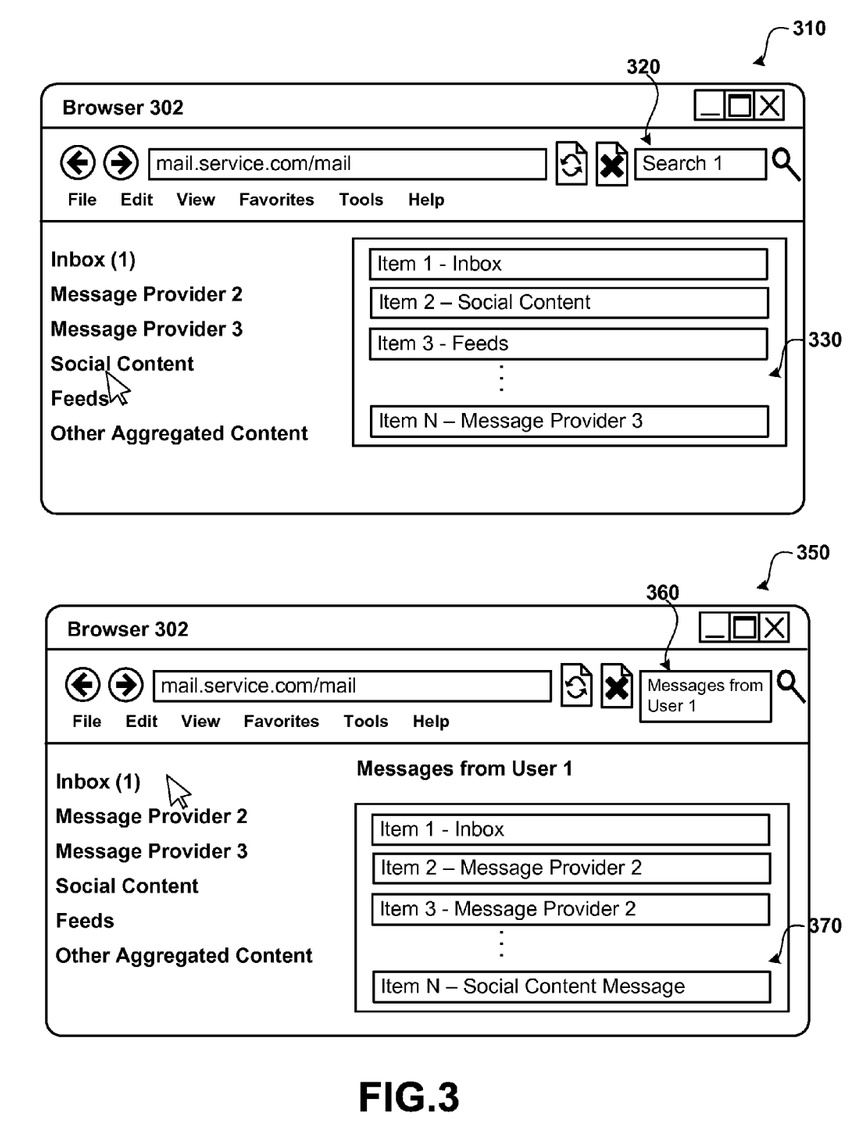
FIG. 3 illustrates a user accessing a cloud service and performing a search across the aggregated content obtained from different content sources.

FIG. 3 illustrates a user accessing a cloud service and performing a search across the aggregated content obtained from different content sources.

Display 310 shows a user performing "Search 1" (320) in browser 302 to locate items obtained from different content sources. The user may select the content sources that they would like searched. In response to performing "Search 1", results 330 are shown. As can be seen, different items from different content sources that were aggregated for the user were located in the search. Instead of the user having to search each different content source separately, two or more content sources may be searched at a single time.

Display 350 shows user performing a search to locate the message from User 1 across different content sources. The user may select the content sources that they would like searched. In response to performing search 360, results 370 are shown. As can be seen, messages from different content sources and message providers are shown on a single display. Instead of the user having to search each different content source separately for messages from the user, two or more content sources may be searched at a single time.

Figure 4:
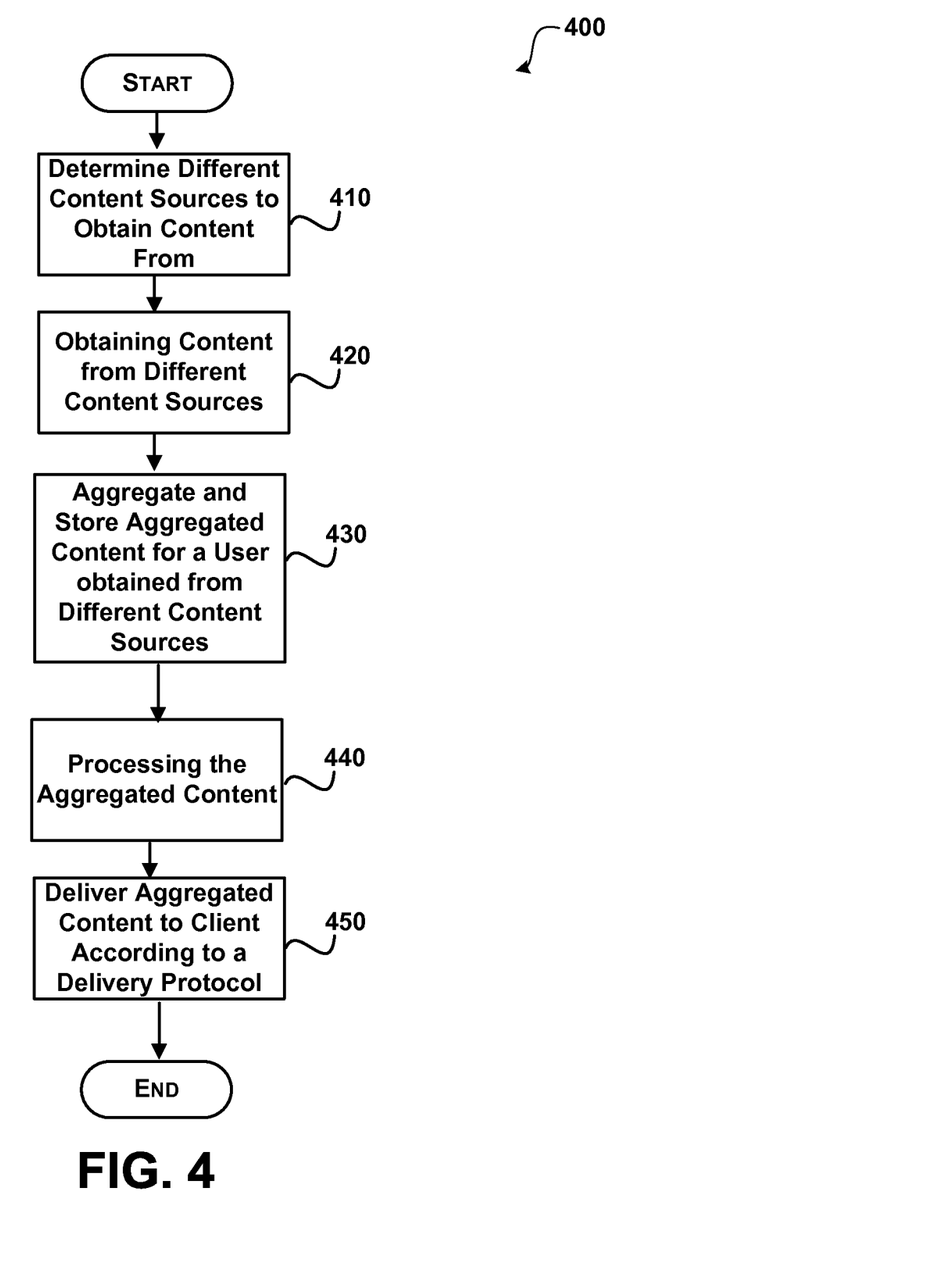
FIG. 4 shows a process of a cloud service aggregating content from different content sources.
Figure 5:
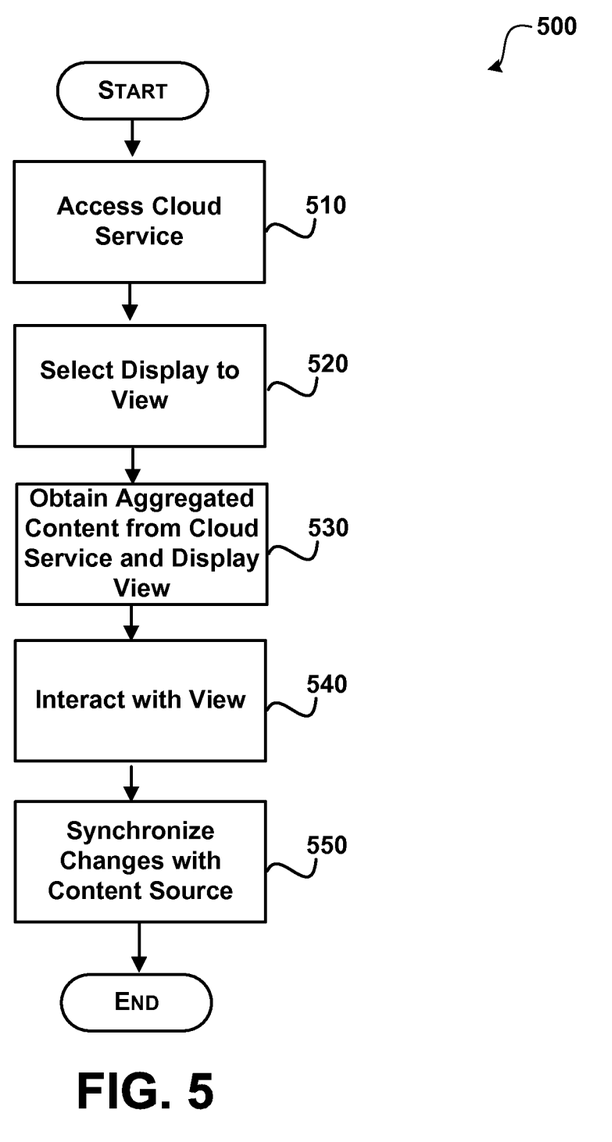
FIG. 5 shows a process of a client interacting with a cloud service that stores aggregated content for the client.

FIGS. 4 and 5 illustrate a process for aggregating content and interacting with the aggregated content using a cloud service. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 4 shows a process of a cloud service aggregating content from different content sources.

After a start operation, the process moves to operation 410, where a determination is made as to what content sources a user would like to aggregate. According to an embodiment, the content sources include content relating to electronic messages, calendars (public, private), contacts, social network content, feed data, search results, and the like. For example, a user may select to aggregate: electronic messages from different message providers (e.g. OUTLOOK, GMAIL, YAHOO, . . . ), contacts from one or more content providers (e.g. LINKEDIN, OUTLOOK, FACEBOOK, GMAIL, . . . ), calendars from different content providers (e.g. public or private), and the like.

Transitioning to operation 420, the cloud service obtains the content from the different content sources. The cloud service uses different protocols to obtain content from the content sources. For example, the cloud service may obtain content using protocols such as: Internet Message Access Protocol (IMAP), Exchange Web Service (EWS), Messaging Application Programming Interface (MAPI), Exchange Active Sync (EAS), Post Office Protocol (POP), Simple Mail Transfer Protocol (SMTP), as well as many other protocols that may be associated with accessing and interacting with content in a content source. Some content sources may use their own defined protocol or may modify a common protocol. The cloud service interacts with each content source using the protocol that is associated with the content source being accessed.

According to an embodiment, the cloud service includes custom provider synchronization interfaces to at least a portion of the content providers. The provider synchronization interfaces are used to obtain additional content and information from the content source than the content that may be obtained using the standard protocol. The provider specific interfaces may obtain information form the provider for one or more provider specific features. Generally, the provider specific interfaces 218 are configured to access features of a content provider that are not available using a common protocol that is associated with the service provider. For example, while mail may be obtained from a mail service provider using a protocol, the defined protocol may not provide functionality to interface with all of the different features that are provided by the service provider. The content may be obtained and updated using different methods. For example, the obtained content may be updated periodically, in response to a notification, or in response to some other event.

Flowing to operation 430, the obtained content is aggregated for the user and stored by the cloud service. According to an embodiment, each content source that is selected by a user to be aggregated is stored separately within data store 230. In other words, the content from one content source is not mixed with content from another content source. In this way, the user's content that is stored by the online service may be easily located and each content source may be easily identified.

Transitioning to operation 440, the aggregated content may be processed by the cloud service. For example, the aggregated content may be augmented with additional content and/or views may be created in advance of the view being requested by a client. For example, a common view (e.g. a weekly view) of a user's calendar may be created in advance of the view being requested. The aggregated content may be organized into different views (e.g. month view, week view, . . . ) and stored for later use. Each different view created by the cloud service contains the data used to render a User Interface display for that view on a client computing device.

Flowing to operation 450, aggregated content is delivered to a client using a single communication channel (e.g. a single delivery protocol). The client interacts with the aggregated data that is stored by cloud service using a single protocol even though cloud service used different protocols to obtain the aggregated content. According to an embodiment, the client is a thin client (e.g. a web browser) that uses the cloud service to perform computations and processing relating to the aggregated content. For example, the cloud service provides PIM services that are typically found in a desktop PIM application.

The process flows to an end operation and returns to processing other actions.

FIG. 5 shows a process of a client interacting with a cloud service that stores aggregated content for the client.

After a start operation, the process moves to operation 510, where the cloud service is accessed. The cloud service stores the aggregated content for a user. According to an embodiment, the aggregated content includes content relating to electronic messages, calendar information, and contacts obtained from different content sources. Other content may be aggregated. According to an embodiment, the cloud service provides services relating to interacting with and viewing electronic messages, calendar information, and contacts. Other cloud services may include other aggregated content and provide other services.

Transitioning to operation 520, a user selects a view to display using their client application (e.g. browser, thin client). For example, a user may make a selection to display a: calendar view (e.g. yearly, monthly, weekly, daily); an electronic message, a contact; a task, and the like. Generally, the view is related to the functionality of the cloud service.

Flowing to operation 530, the aggregated content relating to the view is obtained from the cloud service and the view is displayed at the client. According to an embodiment, the view is obtained from the cloud service. For example, when the view has already been created by the cloud service, the view is obtained from a memory (e.g. a cache or network storage) and delivered to the client for display.

Transitioning to operation 540, a user interacts with the view. For example, a user may make changes to the view, change the content, create a message, create an event, and the like. A user may also perform a search across one or more of the different content sources that are included in the aggregated content. For example, a user may look for messages from particular user across each of their mailboxes, look for contacts obtained from different contact sources, and the like.

Flowing to operation 550, changes made to the aggregated content are synchronized with the external content source. According to an embodiment, instead of just changing the content at the cloud service, the cloud service changes the content at the cloud service and synchronizes the change with the external content source. For example, if a user adds a calendar event to a calendar obtained from service provider 1, then the cloud service synchronizes the calendar that is stored by service provider 1. In this way, when a user accesses the calendar using an application supplied by service provider 1, the change to the calendar is shown.

The process flows to an end operation and returns to processing other actions.

Figure 6:
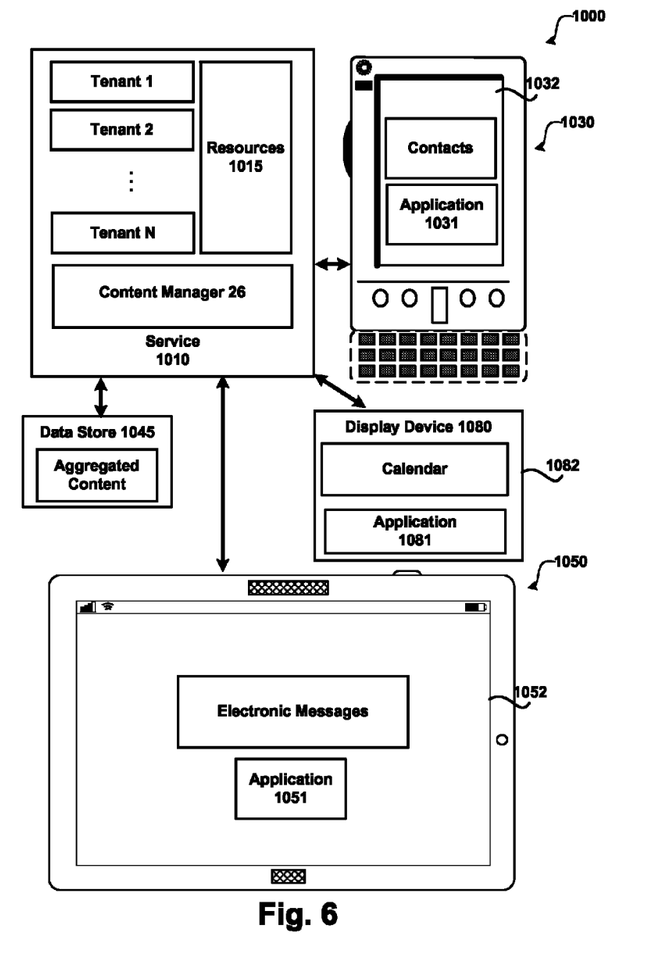
FIG. 6 illustrates an exemplary online system for aggregating content from different content sources.

FIG. 6 illustrates an exemplary online system for aggregating content from different content sources. As illustrated, system 1000 includes service 1010, data store 1045, touch screen input device 1050 (e.g. a tablet/slate), smart phone 1030 and display device 1080.

As illustrated, service 1010 is a cloud based and/or enterprise based service that may be configured to provide services, such as services related to various applications (e.g. whiteboards, searching, games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input/output and each include an application (1031, 1051, 1081).

As illustrated, touch screen input device 1050, smart phone 1030, and display device 1080 shows exemplary displays 1052/1032/1082 showing the use of an application, such as an application that is accessing aggregated content that is associated with a user and stored by service 1010. Data may be stored on a device (e.g. smart phone 1030, touch screen input device 1050 and/or at some other location (e.g. network data store 1045). Data store 1045, or some other store, may be used to store aggregated content as well as other data. The applications used by the devices may be client based applications, server based applications, cloud based applications and/or some combination. According to an embodiment, display device 1080 is a device such as a MICROSOFT XBOX coupled to a display.

Content manager 26 is configured to perform operations relating to aggregating content as described herein.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
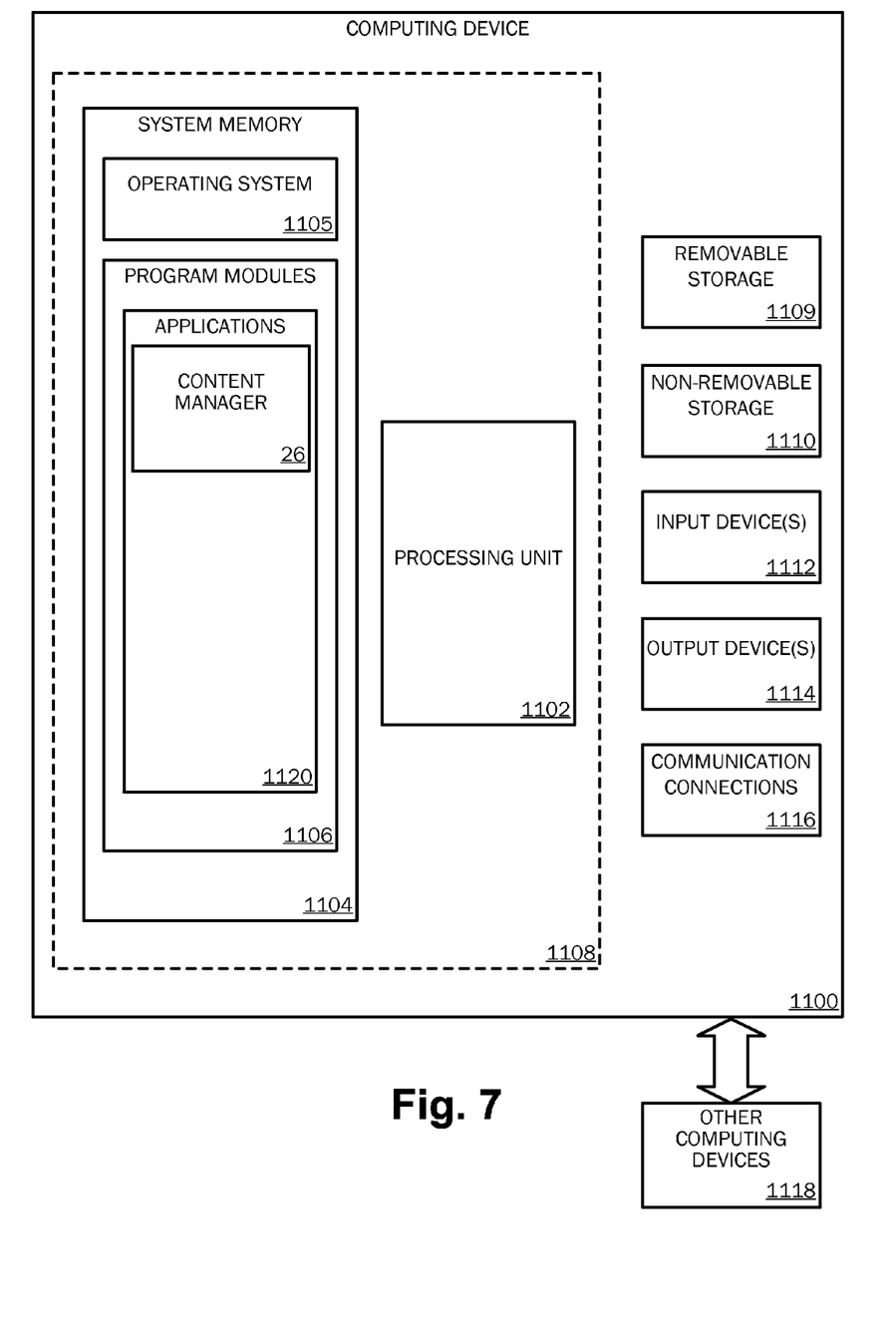
FIGS. 7, 8A, 8B, and 9 and the associated descriptions provide a discussion of a variety of operating environments in which embodiments of the invention may be practiced.
Figure 8A:
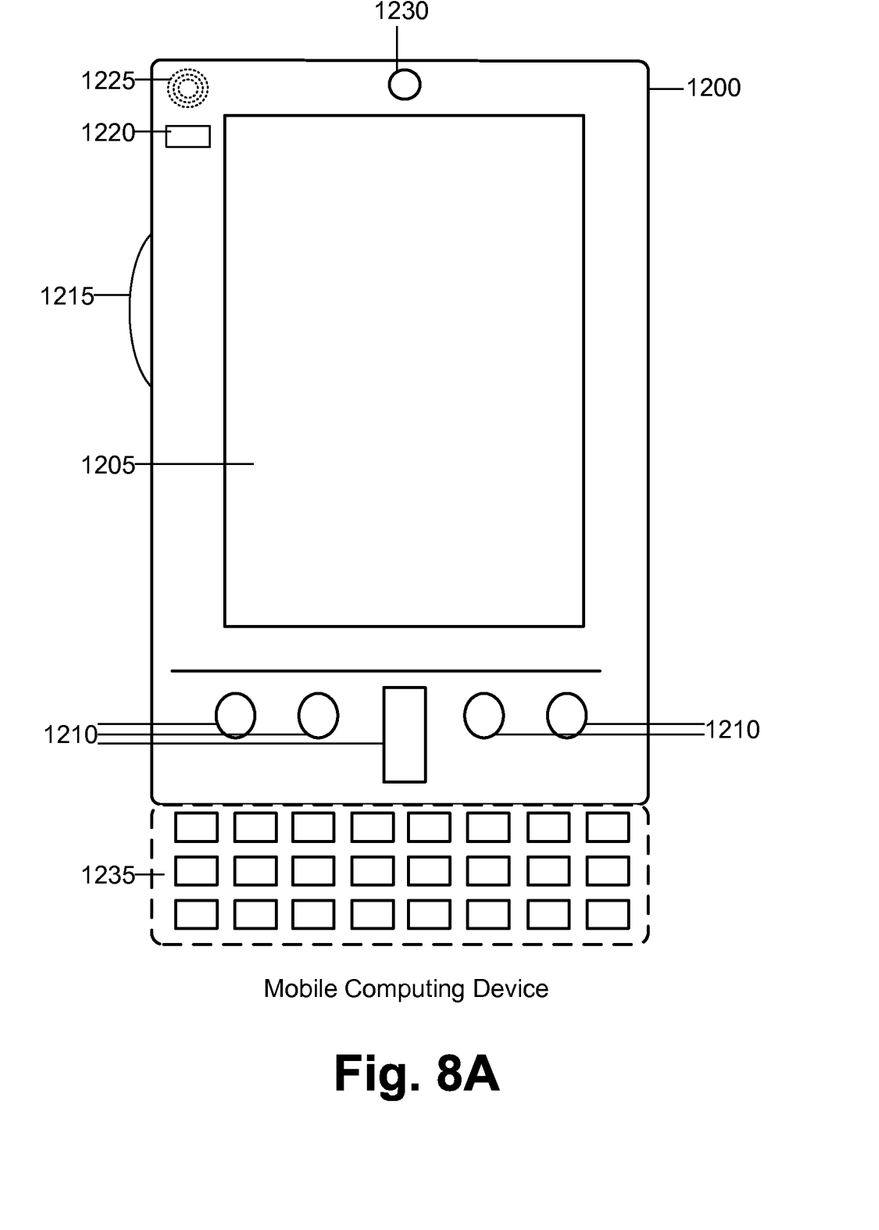
Figure 8B:
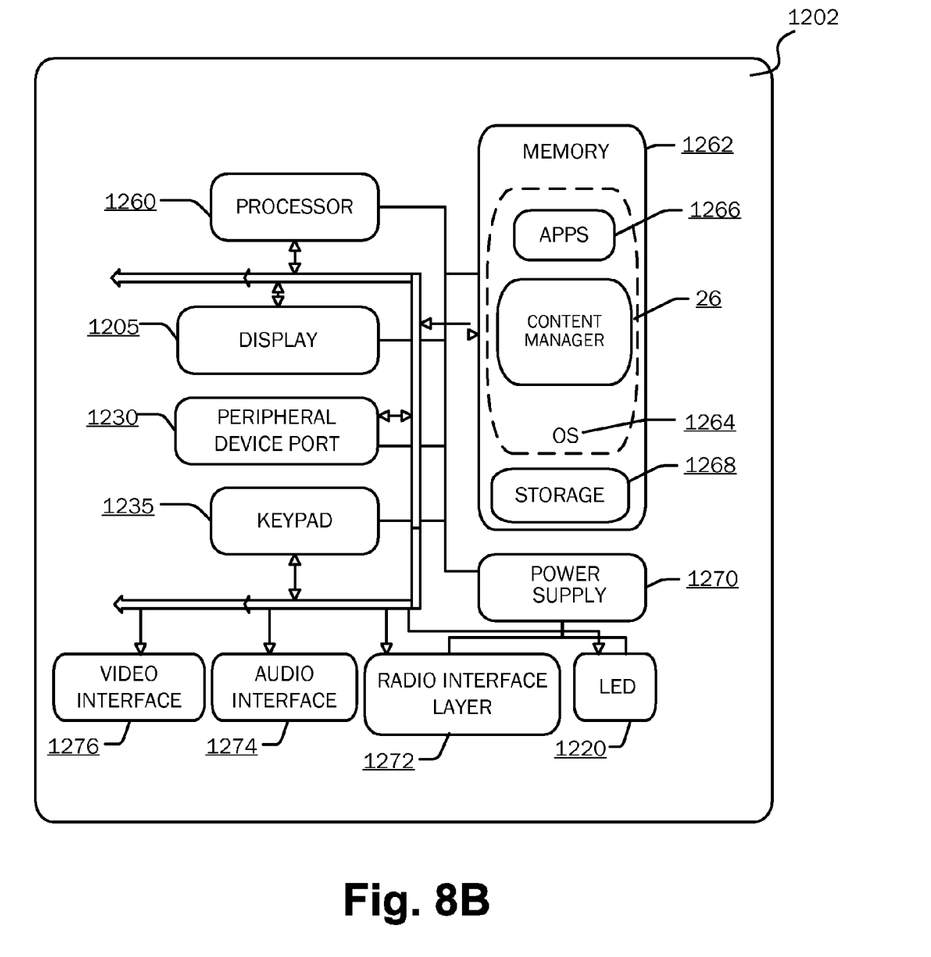
Figure 9:
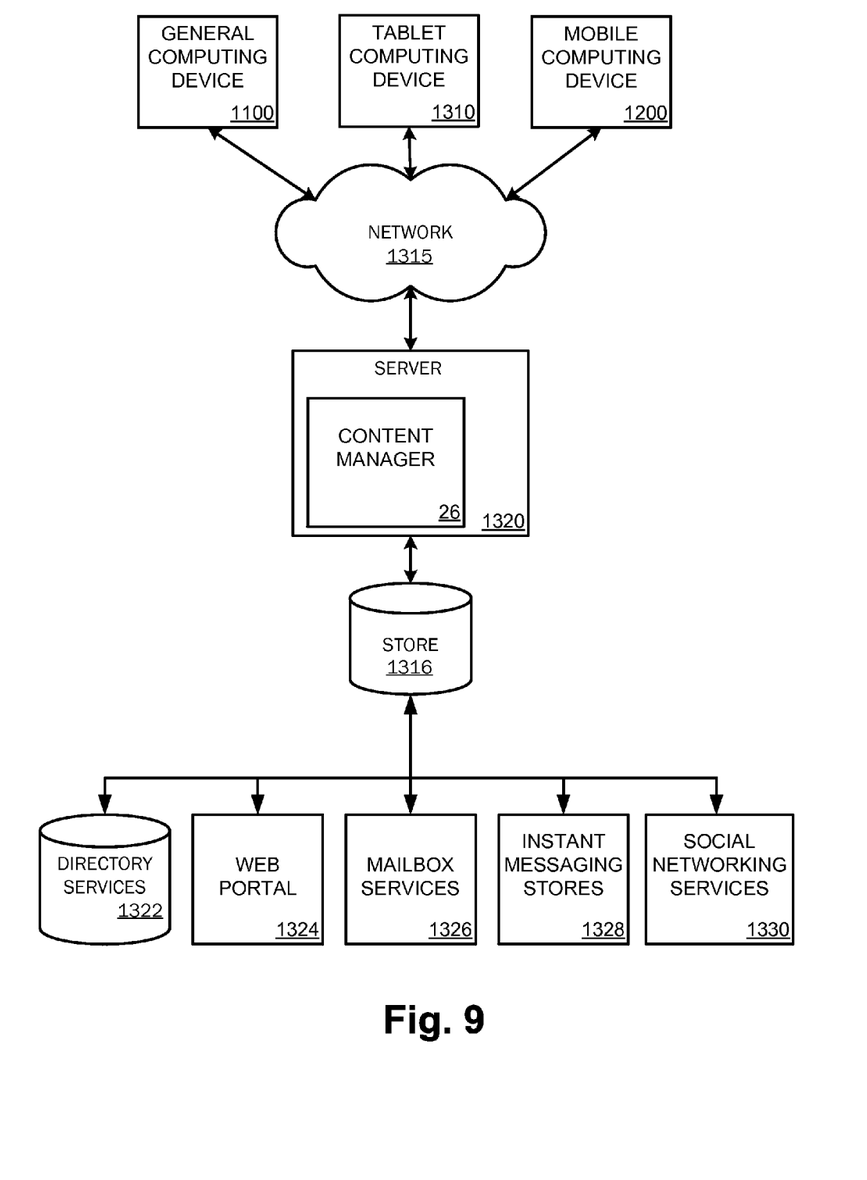

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the content manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 7 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 7 by a removable storage device 1109 and a non-removable storage device 1110.

As stated above, a number of program modules and data files may be stored in the system memory 1104. While executing on the processing unit 1102, the program modules 1106 (e.g., the content manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the content manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 1200, for example, a mobile telephone, a smart phone, a tablet personal computer, a laptop computer, and the like, with which embodiments of the invention may be practiced. With reference to FIG. 8A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the content manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 8B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 9 illustrates an embodiment of an architecture of an exemplary system, as described above. Content developed, interacted with, or edited in association with the content manager 26 may be stored in different communication channels or other storage types. For example, various documents may be stored using a directory service 1322, a web portal 1324, a mailbox service 1326, an instant messaging store 1328, or a social networking site 1330. The content manager 26 may use any of these types of systems or the like for enabling data utilization, as described herein. A server 1320 may provide the content manager 26 to clients. As one example, the server 1320 may be a web server providing the content manager 26 over the web. The server 1320 may provide the content manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for aggregating content at a cloud service, comprising:
    obtaining, by the cloud service, a first content from a first content source that uses a first communication protocol;
    obtaining, by the cloud service, a second content from a second content service that uses a second communication protocol;
    aggregating the first content and the second content at the cloud service to form aggregated content;
    associating the aggregated content with a user;
    storing the aggregated content for the user at the cloud service; and
    using a single delivery protocol to deliver the aggregated content to a client computing device, wherein the single delivery protocol is different from at least one of the first communication protocol and the second communication protocol.

2. The method of claim 1, wherein the aggregated content includes electronic messages, calendar information, and contact information associated with the user.

3. The method of claim 1, wherein obtaining the aggregated content comprises obtaining at least one of: social network content obtained from a social network, search results obtained from a search engine, and feed content.

4. The method of claim 1, further comprising generating different views of the aggregated content at the cloud service and storing the different views at the cloud service.

5. The method of claim 1, wherein storing the aggregated content for the user at the cloud service comprises storing each of the first content and the second content as separate content within a data storage.

6. The method of claim 1, further comprising determining when a change is made to the first content and synchronizing the change back to the first content source.

7. The method of claim 1, further comprising obtaining provider specific information from at least one of the first content source and the second content source.

8. The method of claim 1, further comprising receiving a search query from a client device and performing a search across at least a portion of the aggregated content sources aggregated for the user.

9. The method of claim 2, further comprising: receiving a search query from a client device;
    and performing a search using the search query across the electronic messages.

10. A computer-readable storage device storing computer-executable instructions for aggregating content at a cloud service, comprising:
    Obtaining, by the cloud service, a first content from a first content source using a first communication protocol;
    obtaining a second content from a second content source using a second communication protocol;
    wherein the first content source includes at least one selected from the group consisting of electronic message content, calendar content, and contact content;
    wherein the second content source includes at least one selected from the group consisting of electronic message content, calendar content, and contact content;
    aggregating the first content and the second content at the cloud service to form aggregated content;
    associating the aggregated content with a user;

storing the aggregated content for the user at the cloud service; and using a client delivery protocol to deliver the aggregated content to a client computing device; wherein the client delivery protocol is different from at least one of the first communication protocol and the second communication protocol.

11. A computer-readable storage device of claim 10, further comprising generating different views of the aggregated content at the cloud service and storing the different views at the cloud service.

12. A computer-readable storage device of claim 10, wherein storing the aggregated content for the user at the cloud service comprises storing each of the first content and the second content as separate content within a data storage.

13. A computer-readable storage device of claim 10, further comprising determining when a change is made to the aggregated content and synchronizing the change back to the content source where the content was obtained.

14. A computer-readable storage device of claim 10, further comprising:
obtaining provider specific information from at least one of the first content source and the second content source; and
using a synchronization protocol specified by the provider of the content source.

15. A computer-readable storage device of claim 10, further comprising receiving a search query from a client device and performing a search across at least a portion of the aggregated content.

16. A computer-readable storage device of claim 10, further comprising receiving a search query from a client device and performing a search using the search query across different electronic message content to locate messages from different mail providers.

17. A system for aggregating content at a cloud service, comprising:
a processor and memory;
an operating environment executing using the processor; and
an content manager that is configured to perform actions comprising:
obtaining a first content from a first content source using a first communication protocol, wherein the first content includes at least one of electronic message content, calendar content, and contact content;
obtaining a second content from a second content source using a second communication protocol, wherein the second content includes at least of one electronic message content, calendar content, and contact content;
aggregating the content at the cloud service to form aggregated content;
associating the aggregated content with a user;
storing the aggregated content for the user at the cloud service;
generating different views of the aggregated content at the cloud service; and
using a single delivery protocol to deliver one of the views to a client computing device.

18. The system of claim 17, wherein storing the aggregated content for the user at the cloud service comprises storing each of the first content and the second content as separately within a data storage.

19. The system of claim 17, further comprising determining when a change is made to the aggregated content and synchronizing the change back to the content source where the content was obtained.

20. The system of claim 17, further comprising obtaining a synchronization protocol specified by provider specific information and using the synchronization protocol specified by the provider to communicate with the first content source.

* * * * *